3,234,206
WATER-INSOLUBLE DISAZO DYESTUFFS
Hans Wilhelm Liechti, Basel, Switzerland, assignor to Ciba Limited, Basel, Switzerland, a company of Switzerland
No Drawing. Filed June 25, 1963, Ser. No. 290,335
Claims priority, application Switzerland, June 28, 1962, 7,794/62; May 29, 1963, 6,734/63
6 Claims. (Cl. 260—155)

The present invention provides new disazo dyestuffs which are free from acid groups imparting solubility in water and correspond to the formula (1)         A—N=N—B—N=N—D wherein A and B each represents an aromatic radical which may be substituted, and B contains a nitro group in orthoposition to the azo group linked with D, and D represents the radical of a compound which is capable of coupling and contains an enolisable keto group.

The new compounds are obtained by coupling a diazotized aminoazo dyestuff which is free from acid groups imparting solubility in water and corresponds to the formula (2)         A—N=N—B—NH$_2$ wherein A and B each represents an aromatic radical and B contains a nitro group in ortho-position to the amino group, with a compound containing an enolisable keto group.

Diazo components particularly suitable are aminoazo compounds of the formula (3) 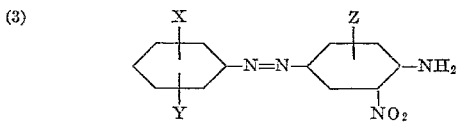

wherein X and Y each represents a hydrogen or halogen atom, or a lower alkyl or alkoxy group and Z represents a hydrogen atom or a lower alkyl or alkoxy group.

The aminoazo dyestuffs of the Formula 3 can be manufactured by known methods, for example by condensing an amine of the formula

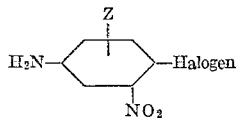

wherein Z has the above meaning, with a nitroso compound of the formula

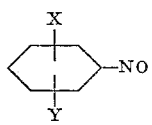

wherein X and Y have the above meanings and treating the resulting condensation product with ammonia to replace the halogen atom in ortho-position to the nitro group by an amino group.

As particularly suitable diazo components the following aminoazo dyestuffs may be specially mentioned:

3-nitro-4-amino-1:1'-azobenzene,
3-nitro-4-amino-4'-methyl-1:1'-azobenzene,
3-nitro-4-amino-4'-chloro-1:1'-azobenzene,
3-nitro-4-amino-4'-methoxy-1:1'-azobenzene,
3-nitro-4-amino-2'-methyl-1:1'-azobenzene,
3-nitro-4-amino-2'-methoxy-1:1'-azobenzene,
3-nitro-4-amino-6-methoxy-1:1'-azobenzene, and
3-nitro-4-amino-6-methyl-1:1'-azobenzene.

As coupling components containing at least one enolizable keto group which may be used in the process of the invention, aliphatic, heterocyclic or hydroaromatic compounds are of particular importance.

Among them the following compounds may be specially mentioned:

Acetoacetic-acid arylamides, particularly the anilides,
Acetoacetic-acid-2'-phenoxy-anilide,
Acetoacetic-acid-2'-, -3' or -4'-chloranilide,
Acetoacetic-acid-2'-nitranilide,
Acetoacetic-acid-2'-carboxyalkyl-anilide,
Acetoacetic-acid-2':5'-dimethoxy-anilide,
Acetoacetic-acid-2':5'-dimethoxy-4'-chloranilide,
Acetoacetic-acid-2'-methoxy-5'-methylanilide,
Acetoacetic-acid-2'-methoxy-4'-chloro-5'-methylanilide,
Acetoacetic-acid-ortho-, -meta- or -para-toluidide,
Acetoacetic-acid-ortho- or -para-anisidide,
Acetoacetic-acid-3'-trifluoromethyl-anilide,
Pyrazolones, especially 3-methyl-pyrazolone-5,
N-phenyl-3-methyl-pyrazolone-5,
N-n-hexyl-3-methyl-pyrazolone-5,
Pyrazolone-(5)-3-carboxylic acid alkyl esters,
1-β-cyanoethyl-3-methyl-pyrazolone-(5),
Hydroxyquinolones, especially
N-methyl-4-hydroxyquinolone-2,
N-n-butyl-4-hydroxyquinolone-2,
Dihydro-dihydroxybenzenes, especially dihydroresorcinol, and 5:5-dimethyl-cyclohexanedione-1:3.

The compounds of the Formulae 2 and 3 may be diazotized in the usual manner, for example with hydrochloric acid and sodium nitrite. According to the invention the diazo-monoazo compounds thus obtained are coupled with the afore-mentioned coupling components in an alkaline medium. When a pyrazolone is used as the coupling component, the coupling may, if desired, be carried out in a neutral or weakly acetic acid medium.

The new dyestuffs, more especially after having been finely dispersed, for example by grinding, pasting, reprecipitating etc. are excellently suitable for dyeing and printing polyester fibrous material, particularly polyethylene terephthalate. By using conventional methods, for example by dyeing from a dye liquor containing a fine dispersion of the dyestuff and, advantageously, a dispersing agent, at a temperature close to 100° C., if desired with addition of a swelling agent, or at temperatures above 100° C. under superatmospheric pressure, pure, strong dyeings of yellow to orange-red tint are obtained. They are distinguished by outstanding fastness to light and sublimation. Moreover, the new dyestuffs possess the advantage that any wool present in the dyebath is only very slightly colored; they are therefore useful for dyeing union-fabrics of polyester and wool.

The dyestuffs of the present invention are also suitable for dyeing by the so-called thermosol process, according to which the fabric to be dyed is impregnated with an aqueous dispersion of the dyestuff which advanageously contains 1 to 50% of urea and a thickening agent, especially sodium alginate, preferably at a temperature not exceeding 60° C., and the impregnated fabric is then squeezed in the usual manner so that the weight increase is advantageously 50 to 100%. To fix the dyestuff on the impregnated fabric the latter is heated—advantageously after a preliminary drying operation, for example in a current of warm air—to a temperature above 100° C. for example a temperature ranging from 180° C. to 210° C.

The thermosol process referred to above is of special value for dyeing mixed fabrics of polyester fibers and cellulose fibers, especially cotton. The padding liquor used in such a case contains, apart from the dyestuffs of the invention, dyestuffs suitable for dyeing cotton, for example vat dyestuffs. When the latter are used, the padded fabric requires after the heat treatment a further treatment with an alkaline aqueous solution of one of the reducing agents conventionally used in vat dyeing.

Unless otherwise indicated, parts and percentages in the following examples are by weight:

Example 1

24.2 parts of 3-nitro-4-amino-1:1'-azobenzene were diazotized and coupled at 5 to 10° C. with 9.8 parts of 3-methyl-pyrazolone-(5) dissolved in 100 parts of water containing 5 parts of 30% sodium hydroxide solution and 20 parts of sodium carbonate. The coupling began immediately and the completely precipitated disazo dyestuff was filtered, washed with water until neutral and dried.

The new, water-insoluble dyestuff of the formula

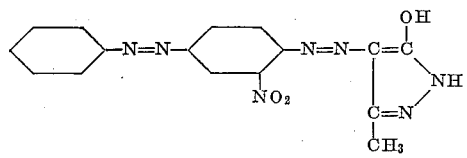

was an orange powder which, when finely dispersed, dyed polyester fibers brilliant yellow shades which were very fast to light and sublimation. Any wool blended with the polyester fiber was only very faintly colored.

Dyeings possessing equally good properties were obtained by using dyestuffs in which the coupling component was N-n-hexyl-3-methyl-pyrazolone-(5) or N-phenyl-3-methyl-pyrazolone-(5) instead of 3-methyl-pyrazolone-(5).

Dyestuffs possessing similar good properties were obtained by using as diazo component 3-nitro-4-amino-2'- or -4'-methyl-1:1'-azobenzene instead of 3-nitro-4-amino-1:1'-azobenzene.

Example 2

The diazo compound from 24.2 parts of 3-nitro-4-amino-1:1'-azobenzene was coupled at 5 to 10° C. with 17.7 parts of actoacetic acid anilide dissolved in 150 parts of water containing 5 parts of 30% sodium hydroxide solution and 20 parts of sodium carbonate. Coupling took place immediately and the resulting disazo dyestuff settled out completely; it was filtered and washed with water until neutral and dried.

The new, water-insoluble dyestuff of the formula

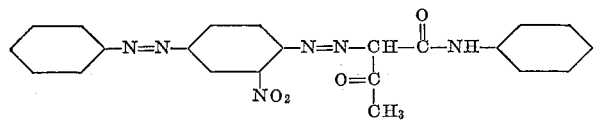

was an orange powder which, when used in fine dispersion, dyed polyester fibers brilliant yellow shades very fast to light and sublimation. Any wool blended with the polyester fiber was only faintly colored.

Dyestuffs having equally good properties were obtained by using as coupling component acetoacetic acid-ortho-, -meta- or -para-toluidide instead of acetoacetic acid anilide.

Equally valuable dyestuffs were obtained by using as diazo component 3-nitro-4-amino-4'-chloro-1:1'-azobenzene or 3-nitro-4-amino-2'- or -4'-methoxy-1:1'-azobenzene instead of 3-nitro-4-amino-1:1'-azobenzene.

Example 3

The diazo compound from 24.2 parts of 3-nitro-4-amino-1:1'-azobenzene was coupled at 5 to 10° C. with 21.15 parts of acetoacetic-acid-2'-chloranilide dissolved in 200 parts of water containing 5 parts of 30% sodium hydroxide solution and 20 parts of sodium carbonate. Coupling took place immediately and the disazo dyestuff formed settled out completely; it was filtered, washed with water until neutral and dried.

The new, water-insoluble dyestuff of the formula

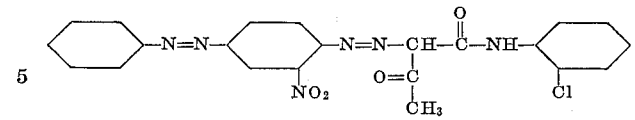

was an orange powder which, when used as a fine dispersion, dyed polyester fibers brilliant yellow shades very fast to light and sublimation. Any wool blended with the polyester fiber was only very faintly colored.

Dyestuffs having equally good properties were obtained when acetoacetic-acid-3'- or -4'-chloranilide was used instead of acetoacetic-acid-2'-chloranilide.

Example 4

The diazo compound from 24.2 parts of 3-nitro-4-amino-1:1'-azobenzene was added at 5 to 10° C. to a solution of 20.7 parts of acetoacetic-acid-para-anisidide in 200 parts of water, 5 parts of 30% sodium hydroxide solution and 20 parts of sodium carbonate. On completion of the coupling reaction the disazo dyestuff was filtered, washed with water until neutral and dried.

The new, water-insoluble dyestuff of the formula

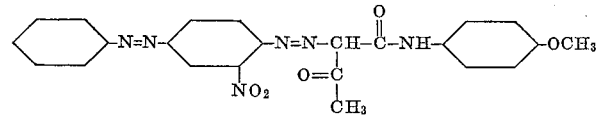

was an orange powder which, when used as a fine dispersion, dyed polyester fibers reddish yellow shades very fast to light and sublimation. Any wool blended with the polyester fibers was only very faintly colored.

Dyestuffs having equally good properties were obtained when, instead of acetoacetic-acid-para-anisidide, one of the following coupling components was used:

Acetoacetic-acid-ortho-anisidide,
Acetoacetic-acid-2':5'-dimethoxyanilide,
Acetoacetic-acid-2':5'-dimethoxy-4'-chloranilide,
Acetoacetic-acid-2'-methoxy-5'-methylanilide, or
Acetoacetic-acid-2'-methoxy-4'-chloro-5'-methylanilide.

Example 5

The diazo compound from 24.2 parts of 3-nitro-4-amino-1:1'-azobenzene was added at 5 to 10° C. to a solution of 17.5 parts of N-methyl-4-hydroxyquinolone-2 in 200 parts of water, 5 parts of 30% sodium hydroxide solution and 20 parts of sodium carbonate. At the end of the coupling reaction the completely precipitated disazo dyestuff was filtered and washed with water until neutral.

The new, water-insoluble dyestuff of the formula

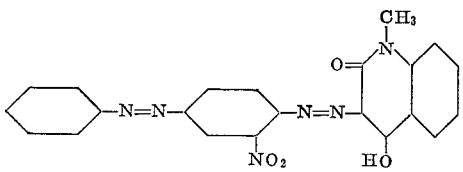

was an orange powder which, when used as fine dispersion, dyed polyester fibers handsome reddish yellow shades very fast to light and sublimation. Any wool blended with the polyester fibers was only very faintly colored.

Dyestuffs having equally good properties were obtained by using N-butyl-4-hydroxyquinolone-2 or 5:5-dimethyl-cyclohexanedione-1:3 ("Dimedone") as the coupling component instead of N-methyl-4-hydroxyquinolone-2.

Example 6

1 part of the dyestuff described in the first paragraph of Example 2 was ground wet with 2 parts of a 50% aqueous solution of sulfite cellulose waste liquor and then dried.

The above dyestuff preparation was stirred with 40 parts of a 10% aqueous solution of a condensation product from octadecyl alcohol and 20 molecular proportions of ethylene oxide. 4 parts of a 40% solution of acetic acid were then added and the mixture was made up with water to 4000 parts of dyebath.

100 parts of a cleaned polyester fiber material were immersed at 50° C. in the above dyebath, the temperature was raised within ½ hour to 120 to 130° C., the material was dyed at this temperature for 1 hour in a closed vessel and then thoroughly rinsed. A strong, brilliant yellow dyeing was obtained having good fastness to light and very good fastness to sublimation.

*Example 7*

100 parts of a cleaned polyester fiber material were immersed for 15 minutes at 50° C. in a dyebath containing 12 parts of diammonium phosphate and 40 parts of a 10% aqueous solution of a condensation product from octadecyl alcohol and 20 molecular proportions of ethylene oxide in 4000 parts of water. A solution of 12 parts of ortho-phenylphenol in dilute sodium hydroxide solution was then added and the material treated for another 15 minutes at 50 to 55° C.

A fine dispersion of 1 part of the dyestuff described in the first paragraph of Example 2 in 2 parts of a 50% aqueous solution of sulfite cellulose waste liquor was then added, and the temperature raised to the boil within ½ hour. The material was then dyed for 1½ to 2 hours at the boil.

The dyed material was then treated for 30 minutes at 60 to 70° C. in a bath containing 2 parts of 30% sodium hydroxide solution and 10 parts of a 10% aqueous solution of a condensation product from octadecyl alcohol and 20 molecular proportions of ethylene oxide in 100 parts of water and rinsed. The resulting strong, brilliant yellow dyeing had good fastness to light and very good fastness to sublimation. Any wool blended with the polyester fiber material was only very faintly colored.

*Example 8*

100 parts of a mixed fabric of equal parts of polyethylene terephthalate fibers and wool were immersed at 50° C. in a bath containing per 1000 parts of water 5 parts of a 75% aqueous emulsion of salicyclic acid methyl ester as accelerator, 1 part of the sodium salt of di-isobutyl-naphthalene sulfonic acid and 1 part of the dyestuff described in the first paragraph of Example 2. In the course of one hour the temperature was raised to the boiling point and kept there for 1½ to 2 hours. The dyed material was then thoroughly rinsed in warm water. No additional cleaning was needed. The polyester was dyed a strong yellow shade whereas the wool was only slightly colored.

*Example 9*

14 parts of the dyestuff described in the first paragraph of Example 2 were finely ground in a ball mill with 126 parts of a neutral solution of 125 parts of dinaphthyl-methanedisulfonic acid in 1000 parts of water.

A padding liquor was then prepared from 200 parts of the dyestuff paste described above,
300 parts of sodium alginate thickening 1:100
500 parts of water
———
1000 parts A polyester fiber fabric was padded twice with the above described liquor, whereupon its weight increased by 50 to 60%. The fabric was then dried at 60° C. and subjected to a heat treatment for 15 to 120 seconds at a temperature ranging from 200 to 220° C. The fabric was soaped for 30 minutes at the boil in a solution containing 5 g. of soap in 1 liter of water and then finished in the usual manner (rinsing, drying). The resulting pure yellow dyeing had excellent properties of fastness.

What is claimed is:
1. A disazo dyestuff of the formula

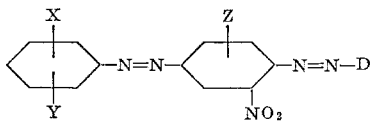

wherein X and Y each represents a member selected from the group consisting of a hydrogen and a halogen atom, a lower alkoxy and a lower alkyl group, Z represents a member selected from the group consisting of a hydrogen atom, a lower alkyl and a lower alkoxy group, and D a member selected from the group consisting of a pyrazolone-5 radical bound in 4-position to the azo group and a radical of the formula

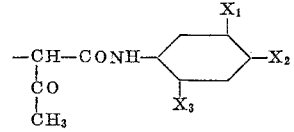

in which $X_1$, $X_2$ and $X_3$ are members selected from the group consisting of hydrogen, chlorine, lower alkyl and lower alkoxy.

2. The dyestuff of the formula

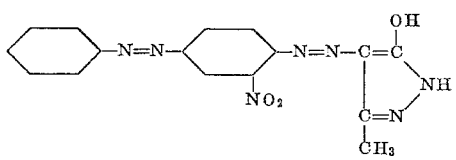

3. The dyestuff of the formula

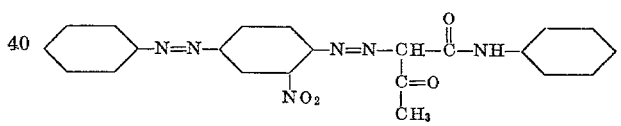

4. The dyestuff of the formula

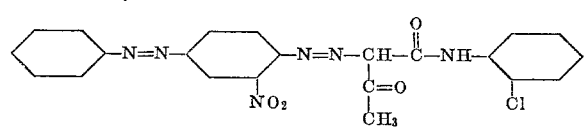

5. The dyestuff of the formula

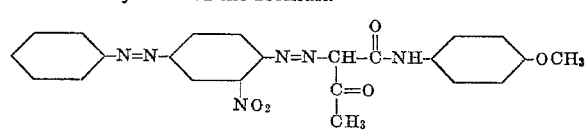

6. The dyestuff of the formula

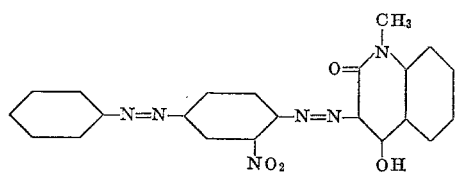

References Cited by the Examiner
UNITED STATES PATENTS
3,037,974    6/1962    Kracker et al. _____ 260—160

CHARLES B. PARKER, *Primary Examiner.*